No. 749,040. Patented January 5, 1904.

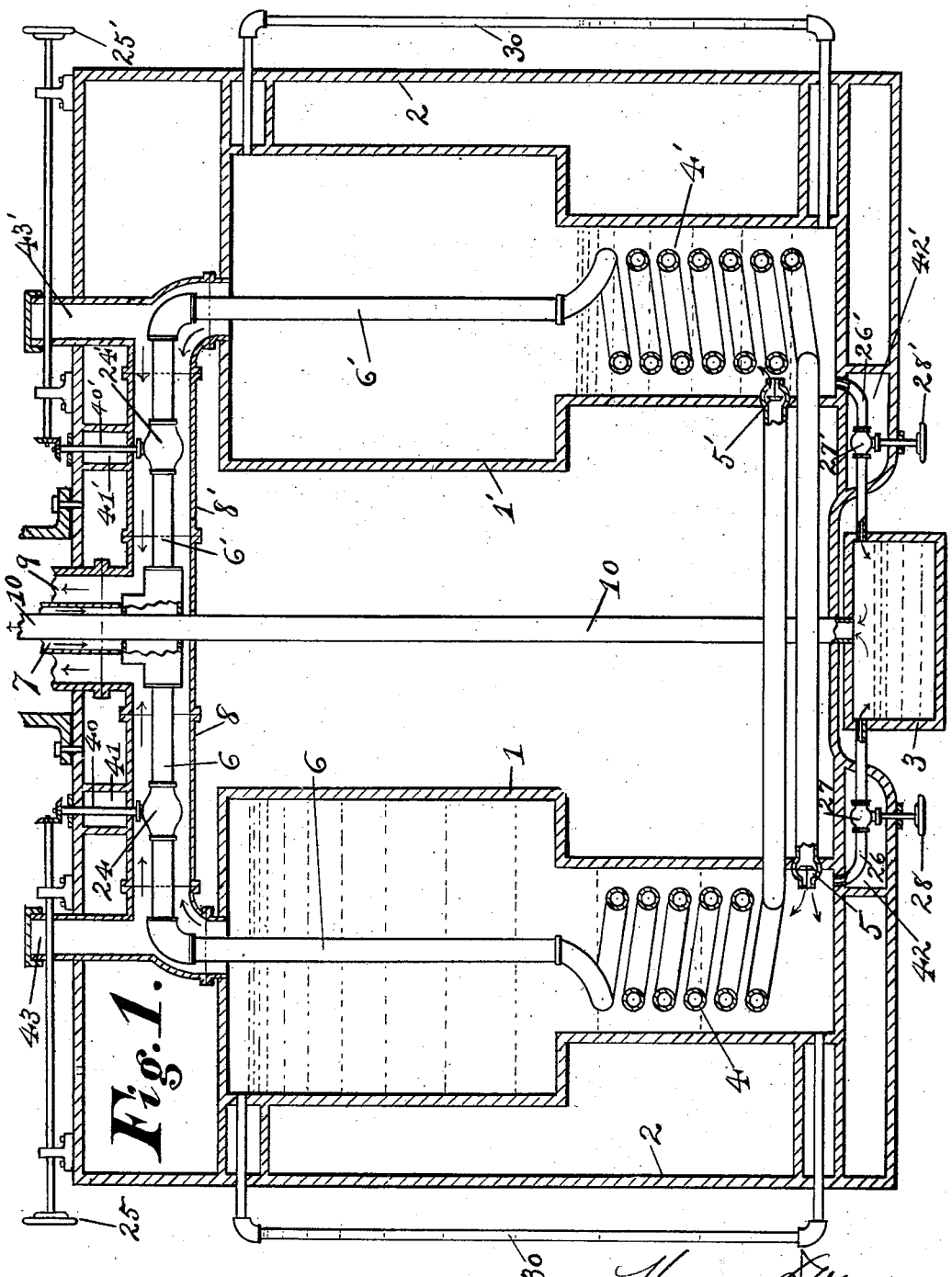

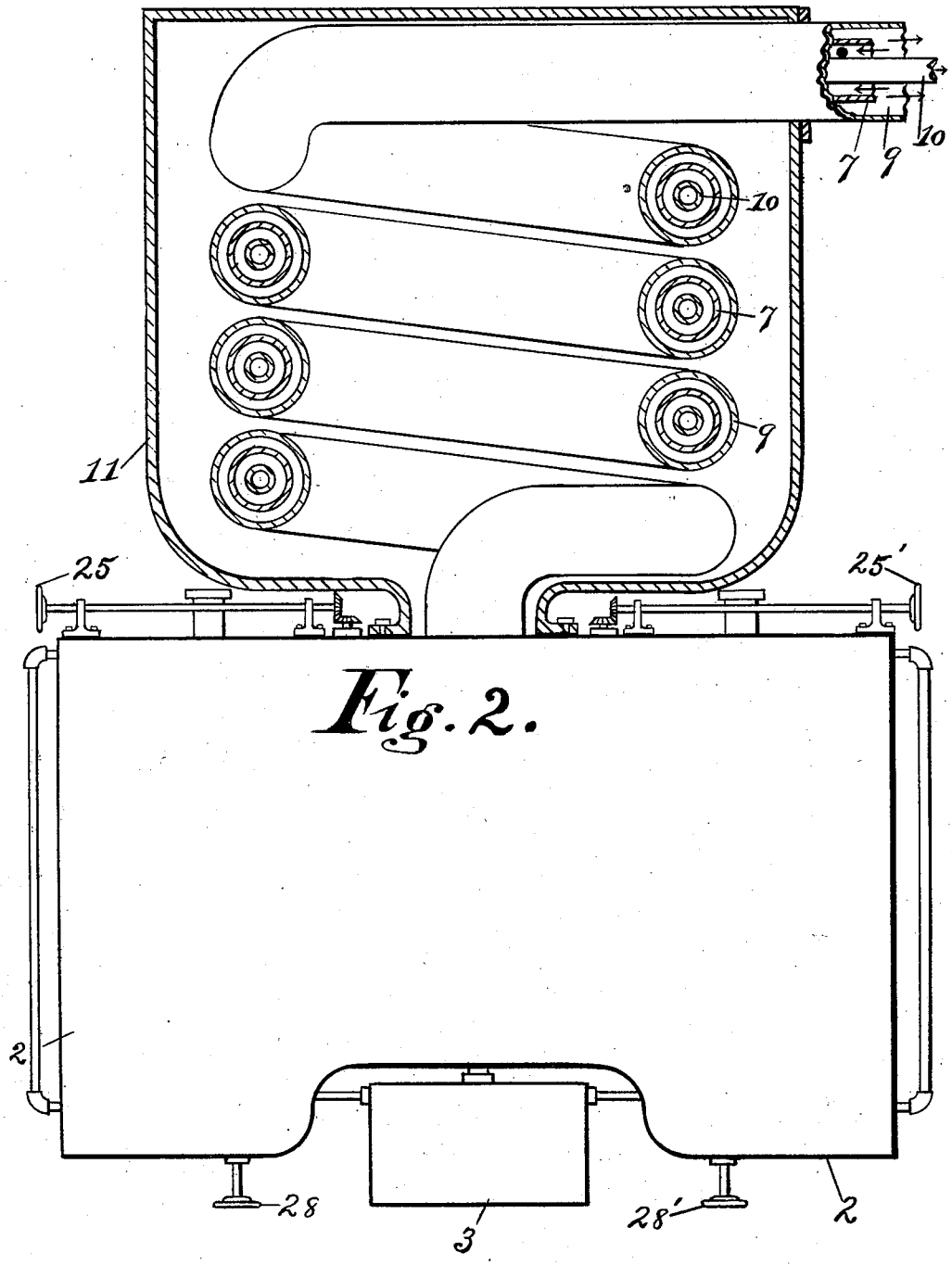

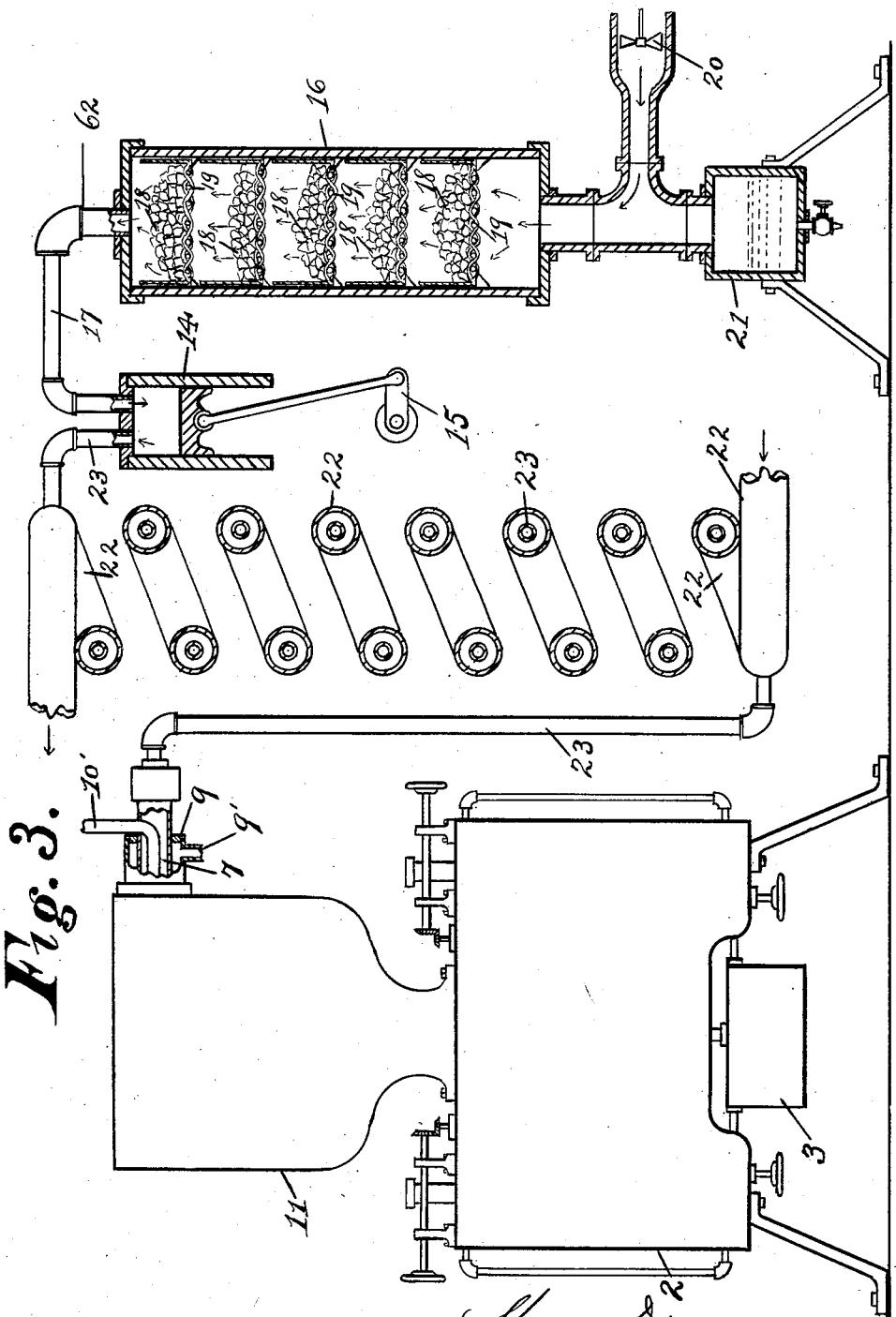

UNITED STATES PATENT OFFICE.

HORACE DUMARS, OF GLENRIDGE, NEW JERSEY.

MECHANISM FOR SEPARATING LIQUID AIR INTO ITS CONSTITUENTS OXYGEN AND NITROGEN.

SPECIFICATION forming part of Letters Patent No. 749,040, dated January 5, 1904.

Application filed December 19, 1902. Serial No. 135,899. (No model.)

*To all whom it may concern:*

Be it known that I, HORACE DUMARS, a citizen of the United States, and a resident of Glenridge, in the county of Essex and State of New Jersey, have invented certain new and useful Improvements in Mechanism for Separating Liquid Air into its Constituents Oxygen and Nitrogen, of which the following is a specification.

This invention relates to apparatus or mechanism for separating liquid air into its constituents, oxygen and nitrogen.

The object is to obtain cheap oxygen and nitrogen and to procure the same readily by means of evaporating liquid air; also, to produce the liquid air as required for the above purpose. These objects are attained in the manner and by the means hereinafter described and claimed, reference being had to the accompanying drawings, in which—

Figure 1 is a view in vertical section of the apparatus, showing the two liquid-air-vaporizing receptacles, the oxygen-tank, &c. Fig. 2 is a view of the double interchanger-coils, partly in vertical section, and a side elevation of the vacuum-case containing the receptacles shown in Fig. 1. Fig. 3 is a side elevation of Figs. 1 and 2 and a view in vertical section of the remainder of the apparatus, the drying-drum, compressor, and water-cooler.

Similar reference-marks refer to similar parts throughout the several drawings.

In Fig. 1 the numerals 1 and 1' refer to two liquid-air-vaporizing vessels which are inclosed in an enveloping vacuum-holder or insulating chamber or case 2. At 3 I show an oxygen tank or vessel which is exposed to the atmosphere and is preferably located below the two vessels 1 and 1', and at 4 and 4' I have two submerged compressed-air-liquefying coils, which are located in the lower end of each of the vessels 1 and 1'. The lower ends of said vessels are preferably made of smaller capacity, as shown, being preferably deeper and of less diameter, so as to have a capacity of about one-fifth the upper part. The coil 4 delivers to the vessel 1', as shown, through the check or release valve 5', and the coil 4' delivers to the vessel 1 through a similar check or release valve 5. The coils 4 and 4' are supplied with compressed air through the branch pipes 6 and 6', which pipes are fed from the main pipe 7, which forms the compressed-air or high-pressure pipe of a double counter-current interchanger. The pipes 8 and 8' form the outlets for the nitrogen vaporized in the vessels 1 and 1', and these outlet-pipes both deliver to the low-pressure conduit 9 of the interchanger. At 10 I have an outlet-pipe for the vaporized oxygen from the oxygen-tank 3, which pipe enters the compressed-air pipe 7 and forms the inner low-pressure outgoing pipe of the double interchanger, being preferably located as an inside coil of the interchanger, as shown in Fig. 2. Thus it will be noticed (see Figs. 1 and 2) that the double interchanger consists of an annular conduit or coil 7 for the incoming compressed air supplied to the vaporizing receptacles or vessels 1 and 1', and of an annular conduit 9, surrounding said compressed-air pipe 7, for the outgoing vaporized nitrogen which is connected with the upper inside of each of the vessels 1 and 1' at its inlet end through the branches 8 and 8', and an inside pipe 10 for the outgoing vaporized oxygen which is connected at its inlet end with the oxygen-tank 3. This is for the purpose of absorbing heat from the incoming compressed air, as such compressed air is, as will be seen, (see Figs. 1 and 2,) surrounded by the outgoing cold nitrogen in pipe 9 on the outside and on the inside has the outgoing current of cold oxygen in pipe 10. To insulate the interchanger as a whole, I preferably inclose the same in the vacuum-chamber 11, Fig. 2.

In Fig. 3 at 14 I show an air-compressor operated from an outside source of power through the crank 15. At 16 I show an inlet air-drum connected with the compressor through the pipe 17, said drum being supplied therein with several charges 18 of calcium chlorid or other hygroscopic substance, being supported within the drum by the screens 19, so that the air can readily pass through or over or in contact therewith as it is forced into the drum by the fan 20. At 21 is a drip-box to catch the brine. At 22 is shown an ordinary water-cooler to absorb the heat of compression from the compressed air as delivered through the pipe 23 from the compressor. This pipe 23 delivers to the annular compressed-air conduit 7 of the interchanger. (See Fig. 3.) Water is supplied to the cooler 22 in the outer conduit, as shown by the arrows. It will be noticed that the air is dried in the drum 16 before delivery to the compressor.

In Fig. 1 I show at 24 and 24' valves or cocks in the pipes 6 and 6', which are opened or closed by the hand-wheels 25 and 25', the valves being connected to the hand-wheel shafts by the rods 40 and 40', which pass through the vacuum in case 2 in the inclosed and protected dead-air spaces 41 and 41'. The oxygen as it gathers in the lower part of either of the vessels 1 or 1' is delivered to the oxygen-tank 3 through the pipes 26 and 26' and valves or cocks 27 and 27', which are opened or closed by the hand-wheels 28 and 28', which outlet-pipes and outlet-valves are inclosed in the protected dead-air spaces 42 and 42', so as not to affect the insulating-vacuum in the case 2. The operation of the valves 24 and 24' and 27 and 27' (shown in Fig. 1) by the hand-wheels 25 and 25' and 28 and 28', respectively, is the preferred construction. Said valves may be operated automatically, however, if preferred.

At 30 and 30' I show two gage-glasses which connect, respectively, with the top and bottom of the vessels 1 and 1', so as to indicate outside the amount of liquid in either of said vessels.

At 43 and 43' I show an inlet to each of the vessels 1 and 1', respectively, through which they may be charged either one with an initial charge of liquid air.

The apparatus as arranged will produce its own initial charge of liquid air; but such production will require a much higher compression of the compressed air than required to keep the apparatus going afterward. Therefore, if preferred, an initial charge may be supplied through either of the inlets 43 or 43'.

The operation of the apparatus is as follows: Air is drawn into the compressor 14, Fig. 3, and after having its moisture removed in the drum 16 it is compressed and the heat of compression removed in the cooler 22, and thence it is conducted in the annular pipe 7, through the interchanger to the coil 4' (in Fig. 1) through the cock or valve 24' and the branch pipe 6'. Its pressure is then released as it passes through the valve 5 after leaving the liquefying-coil 4' and is delivered to the vessel 1. The expanded cool air is then passed back through the pipe 8 and the annular pipe 9, which cools the incoming compressed air in pipe 7, causing a cumulative fall of temperature therein, which finally results in liquefying portions of the air released from the valve 5. When the receptacle 1 is full of liquid air, the cock 24' (see Fig. 1) is closed and cock 24 opened, so that the cooled compressed air is passed down through the branch pipe 6 and liquefying-coil 4, which is now submerged in the liquid air contained in vessel 1. Here it is liquefied, and the liquid air is delivered from the submerged coil to receptacle 1' through the pressure-releasing valve 5'. This operation causes rapid vaporization of the liquid air in vessel 1; but as the liquid nitrogen always vaporizes first from liquid air this cold nitrogen as it vaporizes can be collected from the outlet 9'. (See Fig. 3.)

When four-fifths of the liquid in receptacle 1 has been vaporized, (as shown by the gage-glass 30,) cock 24 is closed, and by opening cock 27 the remaining liquid, which is now practically pure liquid oxygen, is allowed to run into the oxygen-tank 3. During this operation of vaporizing the liquid air in receptacle 1 the other receptacle 1' has been filled with new liquid air from liquefying-coil 4 and valve 5'. Now by closing cocks 24 (and cock 27 after the liquid oxygen has run into the tank 3) and opening cock 24' the cold compressed air is sent through branch pipe 6' and submerged coil 4' and pressure-releasing valve 5 in vessel 1, which operation rapidly vaporizes the liquid air in vessel 1' and causes the other or first vessel 1 to be filled with new liquefied air from the submerged coil 4'. When four-fifths of the liquid in vessel 1' (or the liquid nitrogen) has been vaporized and passed off through the outer conduit 9 of the interchanger, then the cock 24' is closed and cock 27' opened and the liquid oxygen remaining in receptacle 1' is allowed to run into the oxygen-tank 3, the operation being repeated continuously, the oxygen gas being collected (see Fig. 3) from the outlet 10' and the nitrogen at 9'.

Having thus described my invention, what I claim as new and original, and desire to secure by Letters Patent, is—

1. In an apparatus of the class described, the combination of two liquid-air vessels; an oxygen receptacle or tank located below said vessels and connected therewith; and a counter-current interchanger having a high-pressure incoming pipe provided with two branches, each of which branches passes into and through one of said liquid-air vessels and delivers to the other one, substantially as shown and described.

2. In an apparatus of the class described the combination of two liquid-air vessels; and a counter-current interchanger having a high-pressure incoming compressed-air pipe provided with two branches, each of which branches passes into and through one of the said liquid-air vessels and delivers to the other one, substantially as shown and described.

Signed at New York, in the county of New York and State of New York, this 16th day of December, A. D. 1902.

HORACE DUMARS.

Witnesses:
J. F. PLACE,
JOHN H. ACKROYD.